UNITED STATES PATENT OFFICE.

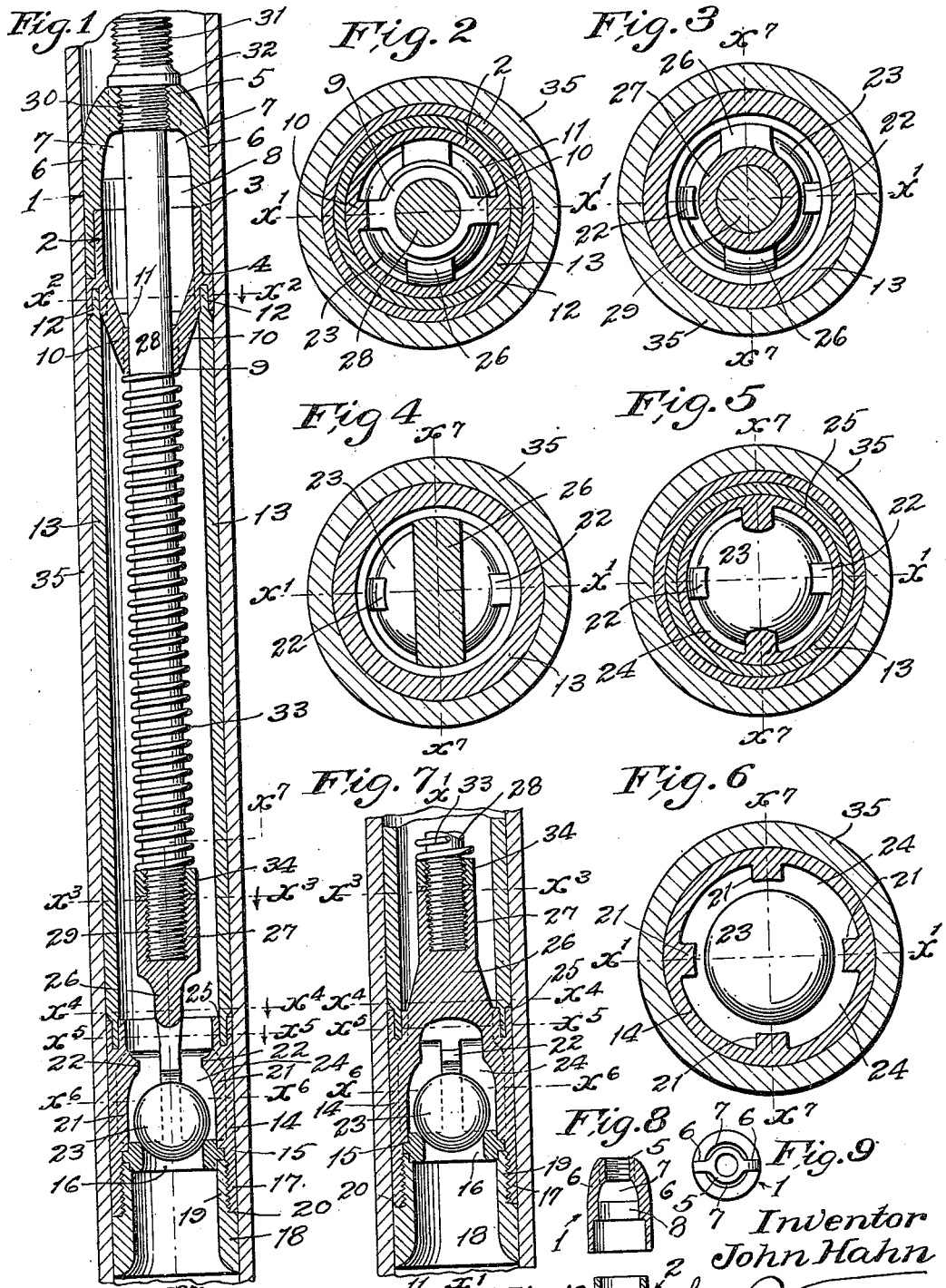

JOHN HAHN, OF LOS ANGELES, CALIFORNIA.

FLUID-PACKING PUMP-PISTON.

993,521.  Specification of Letters Patent.  Patented May 30, 1911.

Application filed February 24, 1910. Serial No. 545,752.

*To all whom it may concern:*

Be it known that I, JOHN HAHN, a citizen of the United States, residing at 716½ East Twelfth street, Los Angeles, in the county of Los Angeles and State of California, have invented new and useful Improvements in Fluid-Packing Pump-Pistons, of which the following is a specification.

This invention relates to improvements which are applicable to the deep well pump shown in my application for Letters Patent of the United States filed Jan. 3, 1910, Serial No. 536,223, in which the pump piston is provided with a packing sleeve.

The object of this invention is to provide a fluid packing plunger pump piston of maximum strength and efficiency.

A further object of the invention is to make provision whereby the flexible packing sleeve will be kept free from sand or other substances which might clog it; also to make provision for using a very flexible packing sleeve that will tightly seal the working barrel when the plunger is being drawn up, and that will move down with minimum friction.

The construction that provides against clogging may be used with or without the device that provides for using a highly flexible packing sleeve, and the invention may be variously embodied.

The invention also includes a novel valve cage and other parts hereinafter particularly described and pointed out in the appended claims.

The accompanying drawings illustrate the invention in the form at present deemed most desirable.

Figure 1 is an elevation partly in section on line $X^1$, Figs. 2, 3, 4, 5, 6, of a pump piston constructed in accordance with this invention and mounted inside a working barrel which is shown in vertical mid-section. Fig. 2 is a cross section on line $X^2$, Fig. 1. Figs. 3, 4, 5 and 6 are cross sections, respectively, on the lines $X^3$, $X^4$, $X^5$, $X^6$, Figs. 1 and 7. Fig. 7 is a sectional elevation of the lower portion of Fig. 1 on line $X^7$, Figs. 1, 2, 3, 4, 5 and 6, further illustrating the construction of the cage. Fig. 8 is a vertical mid-section of the main body of the piston head detached. Fig. 9 is a plan of the main body of the piston head detached. Fig. 10 is a vertical mid-section of the telescoping bushing of the piston head detached. Fig. 11 is a plan of the telescoping bushing of the piston head detached.

The pump piston comprises a piston head and valve cage connected by a central rod and by an external flexible distensible sleeve or tube the ends of which are connected with the piston head and valve cage.

The piston head comprises a main body 1 and a telescoping bushing 2. Said main body is provided with a seat 3 into which the bushing telescopes. Said bushing is provided with a shoulder 4 to contact with the lower end of the body 1 when the bushing is seated in the head. The head is provided with an internally screw-threaded ring 5 supported by arms 6, thus affording passages 7 for flow of liquid from the cylinder 8 of said head. The bushing is provided with a cross bar comprising a ring 9 carried by arms 10 that extend down aslant from the body of the bushing, affording between said arms passages 11 for the liquid to flow through. The bushing is also provided outside said arms with an annular groove 12 to receive the upper end of the distensible packing tube or sleeve 13. The valve cage is formed of a single piece comprising a hollow cylindrical portion 14 which is provided internally with a seat 15 for the valve seat 16 and extends downwardly below said seat and is internally screw-threaded at 17 below said seat to receive the foot piece 18, which is provided with a screw-threaded neck 19 screwed into the valve cage from below and is also provided with a shoulder 20, that fits against the lower end of the valve cage when the foot is screwed home against the valve seat 16. The cylindrical portion 14 of the valve cage is provided internally with vertical ribs 21 which overhang at their upper portions to form stops 22 that conform to the top of the valve 23 which, in the form shown, is a ball and which may be of metal or other suitable material. Between the ribs 21 are channels 24 to afford passages for the liquid around the valve 23. The ribs 21 form guides within the cylindrical portion of the valve cage to cause the valve 23 to properly seat on the valve seat 16.

The top of the cylindrical portion of the valve cage is provided with an annular groove 25 to seat the lower end of the packing tube or sleeve 13. The valve cage terminates at its upper end in a bail 26 having a screw-threaded socket 27 into which is screwed the connecting rod 28 that is smooth and cylindrical throughout its main body and is provided with three screw-threaded portions, viz., the lower tip 29, the bulge 30 and the pin 31, and with a shoulder 32; the threaded portion 29 and the body of the rod 28 are of less diameter than the threaded portion or bulge 30; and the shoulder 32 and threaded portion 31 are larger than the threaded portion 30. The rod 28 extends through the piston head body and bushing and the threaded end 29 is screwed into the socket 27 of the cage and the screw-threaded portion 30 is screwed into the ring 5 of the piston head. The screw-threaded upper tip 31 of the rod forms the pin for attachment to a sucker rod not shown.

The smooth body of the connecting rod 28 slides freely through the ring 9 of the bushing so that said bushing can move freely relative to the main body of the piston head. A spring 33 is interposed between the bushing and the socket of the valve cage, which socket is preferably provided with a lock nut 34 which is screwed on the lower tip 29 of the rod and against the socket 27 of the cage to lock the rod in the cage bail. The spring 33 therefore rests immediately upon the lock nut 34 and tends to uphold the piston head bushing away from the cage and to stretch the packing tube so that it will ordinarily maintain its normal diameter, which is practically the same as the internal diameter of the working-barrel 35, a fragment of which is shown.

The ends of the packing tube 13 may be tightly fixed within the grooves 12 and 25 of the telescoping bushing and the valve cage by any suitable means and are thus sealed to the head and the valve cage.

The grooves 12 and 25 may be of any depth deemed desirable by the constructor, and the ends of the tube may be fixed therein by swaging the walls of the grooves to contract the grooves and compress the ends of the tube after such ends have been inserted thereinto. If desired the tube may be reduced at the ends so as to enter the grooves readily before swaging. This method of fastening the tube in the grooves is readily understood by those skilled in the art and a detailed illustration of the steps of such method is not necessary.

By thus combining with a cage having a valve closed valve seat and means to operate the cage, a straight flexible tube corresponding in diameter to and forming an upward extension of the cage and being freely open at its lower end to the interior of the cage, accumulations of sand and gummy oil can not occur to clog the passage between said extension and the means to operate the cage. This is very important in order that the flexibility of the flexible tube may be maintained.

The cylindrical portions of the piston head and valve cage snugly fit the interior of the working-barrel 35 so as to practically exclude liquid pressure from the exterior of the packing tube 13, and said packing tube may be of any desired rigidity or flexibility.

The purpose of the spring 33 is to admit of the use of a highly flexible and distensible packing tube without liability of the same doubling or folding, and said spring may be dispensed with in deep well pumps where the internal pressure of the liquid carried by the valve cage and valve is sufficient to distend a packing tube which will normally maintain its connection with and its cylindrical form between the piston head and the valve cage so that the apparatus may be used when the spring 33 is omitted.

In practical operation, when the upstroke occurs, the liquid which is carried by the valve cage and valve tends to distend the packing tube and consequently to slightly shorten the same. This tendency to shorten the tube will increase as the outside of the tube becomes worn, and is accommodated by movement of the telescoping bushing of the head. On the down stroke the piston passes the liquid freely which carries through the piston any sand or other clogging substances contained in the liquid so that all liability of impeding the yielding action of the tube by accumulations against the same is done away with.

The tube may be made of india rubber, canvas or a combination of these two materials, or of any other suitable material within the judgment of the practical engineer.

The tendency of the spring is to constantly keep the tube stretched.

I claim:—

1. A pump piston comprising a cage provided with a valve seat, a valve movable in the cage to open and close the valve seat, a flexible tube forming an upward open tubular extension of the cage, a rod fixed to the cage and extending upward therefrom through, and free from the tube to connect with the sucker rod of the pump, there being a free open passage from the cage upward through the tube and around the rod, one end of said tube being freely movable up and down relative to the rod.

2. In a pump piston, a cage provided with a valve seat and a bail and with an upwardly open annular groove having smooth vertical outer and inner walls, there being a passage through the cage and between the annular groove and the bail, said annular groove being in the top edge of the cage and adapted to seat a sleeve, and a sleeve having its lower end inserted in said annular groove, substantially as and for the purpose set forth.

3. A pump piston comprising a head having a telescoping bushing, said bushing provided with an annular groove, a cage provided with an annular groove, a tube having ends in the grooves, and a rod connecting the cage and the head.

4. A pump piston comprising a head comprising a main body provided with a telescoping bushing, a valve cage, a tube connecting the valve cage and bushing, a rod inside the tube connecting the valve cage and main body of the head, and a spring between the cage and telescoping bushing to press them apart.

5. In a pump piston, a piston head provided with a telescoping bushing, said bushing being adapted for connection with the upper end of a tube and provided with a cross-bar; a valve cage, a tube connecting the telescoping bushing and the valve cage, a rod extending through the cross bar and connecting the valve cage with the main body of the head, and a spring between the valve cage and cross-bar to hold the telescoping bushing and the valve cage apart.

6. A fluid-packed piston head provided with a packing tube and a spring to hold the tube stretched.

7. In a pump piston the combination of a cage, a head, a rod connecting the head and cage and a tube connected with the cage and head, one of said connections being movable to allow the tube to shorten so as to expand.

8. In a pump piston the combination of a rod provided with a threaded pin, a threaded bulge and a threaded tip, a head having a cross bar through which the bulge is screwed and a cage having a bail with a threaded socket into which the tip is screwed.

9. In a pump piston the combination of a rod provided with a threaded pin, a threaded bulge and a threaded tip, a head having a cross bar through which the bulge is screwed and a cage having a bail with a threaded socket into which the tip is screwed, and a packing tube carried between the cage and head.

10. In a pump piston a cage, a valve for the cage, a flexible tube forming an upward extension of the cage, means to operate the cage and means to stretch the tube endwise.

11. In a pump piston, the combination with a cage having a valve closed valve seat, of means to operate the cage and a straight flexible tube corresponding in diameter to and forming an upward extension of the cage; the flexible tube being freely open at its lower end to the interior of the cage so that accumulations of sand and gummy oil cannot occur to clog the passage between said extension and the means to operate the cage.

In testimony whereof, I have hereunto set my hand at Los Angeles California this 18th day of February, 1910.

JOHN HAHN.

In presence of—
   JAMES R. TOWNSEND,
   L. BELLE RICE.